United States Patent
Honda et al.

(10) Patent No.: US 8,804,104 B2
(45) Date of Patent: Aug. 12, 2014

(54) APPARATUS, SYSTEM, AND METHOD FOR MEASURING THREAD FEATURES ON PIPE OR TUBE END

(75) Inventors: Tatsuro Honda, Osaka (JP); Mutsumi Tanida, Osaka (JP); Seiji Hiraoka, Osaka (JP); Yasuhisa Kasa, Osaka (JP); Konrad Friedrich, Jena (DE); Erhard Gruener, Grossloebichau (DE)

(73) Assignees: Nippon Steel & Sumitomo Metal Corporation, Tokyo (JP); Carl Mahr Holding GmbH, Goettingen (DE)

( * ) Notice: Subject to any disclaimer, the term of this patent is extended or adjusted under 35 U.S.C. 154(b) by 715 days.

(21) Appl. No.: 12/934,822

(22) PCT Filed: Mar. 26, 2009

(86) PCT No.: PCT/JP2009/056062
§ 371 (c)(1),
(2), (4) Date: Dec. 20, 2010

(87) PCT Pub. No.: WO2009/119713
PCT Pub. Date: Oct. 1, 2009

(65) Prior Publication Data
US 2011/0164244 A1 Jul. 7, 2011

(30) Foreign Application Priority Data

Mar. 27, 2008 (JP) ................................. 2008-083221

(51) Int. Cl.
*G01N 21/00* (2006.01)
*G01B 11/24* (2006.01)
*G01B 5/16* (2006.01)

(52) U.S. Cl.
CPC ............ *G01B 11/2425* (2013.01); *G01B 5/163* (2013.01)
USPC ............................ 356/72; 356/601; 33/199 R

(58) Field of Classification Search
CPC .............................. G01B 11/2425; G01B 5/163
USPC ............... 356/72, 237.1, 239.7, 240.1, 241.1, 356/241.5–241.6, 426, 600–602, 609; 382/108
See application file for complete search history.

(56) References Cited

U.S. PATENT DOCUMENTS

| | | | | |
|---|---|---|---|---|
| 3,515,481 A * | 6/1970 | Brault et al. | ...................... | 356/73 |
| 4,184,265 A * | 1/1980 | Horton | .......................... | 33/199 R |
| 4,629,224 A * | 12/1986 | Landriault | ...................... | 285/334 |
| 5,020,229 A * | 6/1991 | Schwarz et al. | ............ | 33/199 R |
| 2006/0261294 A1 * | 11/2006 | Johnson | ................... | 250/559.42 |

FOREIGN PATENT DOCUMENTS

| | | |
|---|---|---|
| JP | 63-212808 | 9/1988 |
| JP | 05-231857 | 9/1993 |
| JP | 3552440 | 10/1997 |
| JP | 2006-78327 | 3/2006 |
| JP | 2007-10393 | 1/2007 |
| JP | 2007-33174 | 2/2007 |

OTHER PUBLICATIONS

Ogasawara, "Current Status of Tubular Connections for OCTG," Tetsu-to Hagane, The Journal of Iron and Steel Institute of Japan, May 1, 1993, vol. 79, No. 5, pp. N352-N355.

* cited by examiner

*Primary Examiner* — Gregory J Toatley
*Assistant Examiner* — Rufus Phillips
(74) *Attorney, Agent, or Firm* — Clark & Brody

(57) ABSTRACT

A first thread feature is measured by detecting with an optical sensor 2 light that reaches from a light source 21 located on the opposite side of a pipe axis and runs substantially in parallel to thread grooves A4. A contact probe 31 of a contact sensor 3 is contacted with a thread flank surface A8 to detect the space coordinates of the contact probe 31 at the time of contact, so that a second thread feature is measured. The first and second thread features thus detected are combined with each other by a processor 4, and thread features of the thread provided as a measurement object are thereby calculated.

7 Claims, 10 Drawing Sheets

Bridge of Thread Crest

Plane U

Thread Crest Height

Flank Surface

Intersection Line of Flank Surface and Plane U

Coordinate Rotation Angle ($\eta$)

Fig. 12
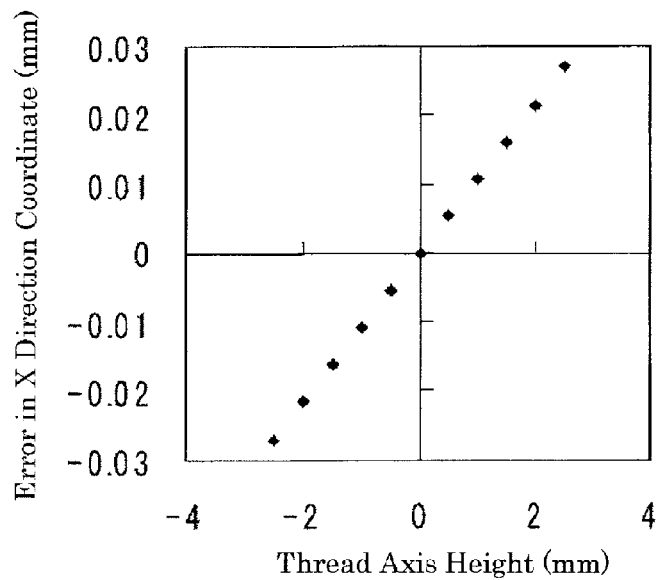
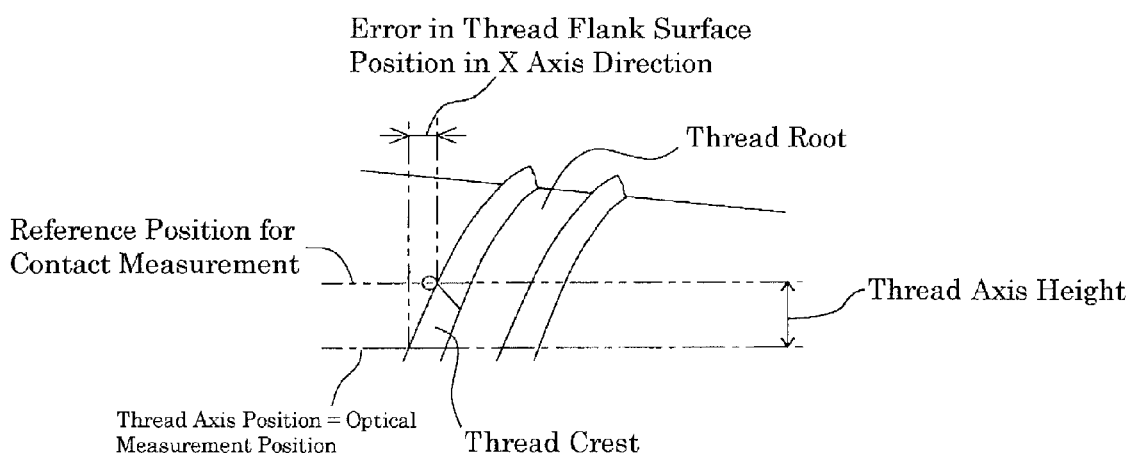

APPARATUS, SYSTEM, AND METHOD FOR MEASURING THREAD FEATURES ON PIPE OR TUBE END

FIELD OF THE INVENTION

The present invention relates to a thread feature measurement apparatus for measuring thread features on an end of a threaded pipe or tube such as Oil Country Tubular Goods (OCTG) and to a thread feature measurement system including the apparatus, the system being applicable to automatic continuous processing lines such as a pipe or tube production line and a conditioning line including a pipe or tube inspection part for threaded pipes or tubes. The present invention also relates to a method of measuring thread features using the apparatus. Hereinafter, "pipe or tube" is referred to as "pipe" when deemed appropriate.

DESCRIPTION OF THE RELATED ART

Conventionally, to join, e.g., OCTG at ends, threads are formed on the ends for threading engagement. Various improvements in, e.g., thread geometry are made on the threads in order to accommodate further deepening of oil wells and environmental friendliness in connection with corrosion (see, e.g., Non-patent Document 1 (Masao Ogasawara, "Current Status of Tubular Connections for OCTG," *Tetsu-to-Hagane*, The Journal of The Iron and Steel Institute of Japan, May 1, 1993, Vol. 79, No. 5, pp. N352-N355)). The geometries of the threads (including a threaded portion up to a seal portion at a front end in FIG. 6, which are described later) are crucial to the quality for use as OCTG.

Depending on oil well conditions, such threads are provided at ends of a pipe of several tens of meters in length and several hundreds of kilograms in weight and have an intricate and highly precise thread geometry.

FIG. 6 is a cross-sectional view showing an exemplary end of a threaded pipe, and FIG. 7 is a partly enlarged view of the threaded portion of FIG. 6. As shown in FIG. 6, a thread A2 on a pipe end includes, in some cases, a threaded portion A5 provided with thread crests A3 and thread grooves A4, a parallel portion A7 provided on a front side of the threaded portion A5, and a seal portion A6 in a tapered shape provided at a front end of the pipe. Each of these portions is designed and processed into appropriate dimensions. Tolerances are defined for the respective features of these intricately shaped portions, which tolerances are material items in the quality control.

These quality control items have been heretofore measured manually; however, in view of laborsaving, prevention of human errors, as well as enhancement in speed and accuracy of measurement, attempts have been made to develop an automatic measurement technique with higher accuracy.

Specifically, known in relation to a technique of measuring thread features of a thread provided on a pipe end for inspection of the threaded pipe end is an automatic measurement apparatus with an optical sensor; the optical sensor applies parallel light from a light source to thread grooves in a direction substantially parallel thereto and detects light reaching on the opposite side of the pipe axis from the light source, and the apparatus measures thread features based on the result of detection of the optical sensor (see, e.g., Patent Document 1 (Japanese Patent No. 3552440) and Patent Document 2 (Japanese Unexamined Patent Publication No. 63-212808)).

Patent Document 1 discloses a method of applying light parallel to thread grooves and detecting the light passing through the thread, wherein an image of a contact chip of a contact sensor is superimposed to the thread geometry diagram measured (hereinafter referred to as a thread profile) in such a manner as to meet, virtually, the thread internally, hence to enable measurement of the thread features using the coordinates of the virtual contact chip at this point. The method described in Patent Document 1 aims at obtaining highly accurate output on the assumption that the results obtained through conventional measurement are true, by manipulating the output to be close to the results of inspection heretofore performed by humans using, e.g., an API gauge (a contact gauge with a contact chip). In this method, a halogen lamp is used for the light source, and a CCD camera is used for the photodetector.

In addition, Patent Document 2 discloses a configuration in which the position of an endface of a mechanical seal and the inclination thereof are obtained through contact measurement to find the position and inclination of the endface of a thread, and the outer diameters of, e.g., a seal portion and a threaded portion are obtained through contact measurement, while the outer shape (the raised and recessed shape of the surface), i.e., the thread profile, is obtained through non-contact (optical) measurement. That is, the exact shape of a thread coupling is acquired through non-contact measurement and is processed into a composite image, based on the inclination of the thread axis and the outer diameter of the threaded portion that are obtained through the contact measurement. The measuring method aims at improving accuracy of measurement by means of correction on thread axis inclination based on the highly accurate data obtained through contact measurement, as well as at expediting measurement of thread profiles involving a number of measurement points by performing the measurement optically. The optical measurement used therein is a method in which a laser beam is cast as the parallel light to detect the position at which the beam is intercepted by the thread, with a photodetector disposed opposite the light source with the thread interposed therebetween. In Patent Document 2, it is also disclosed that, in consideration of thermal expansion as an effect of temperature, the temperature of a reference sample is measured and the result thereof is used for correction.

SUMMARY OF THE INVENTION

The aforementioned techniques, however, have not sufficient performance that all thread features can be measured automatically, rapidly and highly accurately. Particularly on thread features associated with flank surfaces A8 (see FIGS. 6 and 7) between the thread crests A3 and the thread grooves A4 of the threaded portion A5, it is still difficult to attain satisfactory measurement accuracy.

In addition, modern threads have come to have even more complex shapes, which renders the measurement yet more difficult. For example, as shown in Non-patent Document 1 and FIG. 7, in coupling, e.g., OCTG at ends, such a threaded pipe is used that the flank surfaces A8 on the inner side in the pipe axis direction of the thread crests on the pipe end, i.e., the flank surfaces A8 at the side exposed to a load when tensile force acts in the pipe axis direction, are formed into flank surfaces that approach central portions of the thread crests A3 as the flank surfaces advance down from the tips to the bases of the thread crests (hereinafter referred to as hooked flank surfaces A8*h*). The thread features associated with such hooked flank surfaces A8*h* render automatic measurement further difficult to carry out.

The present invention was made in view of the foregoing problems, and it is an object of the invention to provide a thread feature measurement apparatus capable of measuring thread features associated with flank surfaces of thread features on an end of a threaded pipe, a thread feature measurement system including the apparatus, and a thread feature measuring method using the apparatus.

The present inventors studied the aforementioned conventional problems. As a result, the inventors have discovered the following.

<1. Problems Due to Use of an Optical Sensor for Measurement of Flank Surfaces>

The inventors first studied problems regarding measurement of thread features associated with flank surfaces that are located between thread crests and thread grooves as shown in FIG. 7. In the quality assessment of threaded pipes, the positions of flank surfaces of a thread (a processed portion on an end of a pipe that has been processed by lathe and has the same axis as the thread axis) are requirements for measurement of, e.g., a thread crest width, a thread groove width, a thread pitch, and a lead angle. These items can be measured with reference to a coordinate axis that is parallel to the thread axis (the axis of symmetry of surfaces tangent to the perimeter of the thread or of the bottom surfaces of the thread grooves) and passes through respective central portions, heightwise of the thread crests, of the flank surfaces. For example, the thread pitch and lead angle are found from the distance between the central portions, heightwise of the thread crests, of the corresponding flank surfaces of adjacent thread crests.

Patent Documents 1 and 2 describe measuring a thread profile in the method of applying light parallel to thread grooves to detect the light passing through the thread. Since, however, the thread profile makes a curve, in the optical measuring method of detecting parallel light, flank surfaces may be placed in the shade of the ridges of thread crests, in which case the flank surfaces are unable to be measured correctly. For example, in the thread profile as shown in FIGS. 6 and 7 wherein the flank surfaces are perpendicular to or nearly perpendicular to the thread axis, errors due to the flank surfaces' being hidden in the shade of the ridges of the thread crests pose a significant problem in detecting the positions of the flank surfaces at the heightwise central portions of the thread crests.

The problem is elucidated below. The Cartesian coordinate system is used for the space coordinate axes in the present description. The centripetal axis of a pipe gripping mechanism to be described later, the axis substantially following the pipe axis and thread axis, is an X axis. The axis orthogonal to the X axis and parallel to a horizontal plane is a Y axis. The (vertical) axis perpendicular to the X-Y plane is a Z axis.

FIGS. 8A to 8C illustrate projecting a trajectory of flank surfaces at their central positions in thread crest direction, in a common thread. FIG. 8A shows a state in which the trajectory of the flank surfaces at their central positions in thread crest direction crosses a plane that is perpendicular to the Y axis. FIG. 8B shows a projection diagram in which a flank surface is projected onto a plane V that is perpendicular to the X axis when an intersection point of the plane U of FIG. 8A and the Y axis is at the central position in thread crest direction of the flank surface. FIG. 8C shows an intersection line of the flank surface and the plane U when the intersection point of the plane U of FIG. 8A and the Y axis is at the central position in thread crest direction of the flank surface (as shown in FIG. 8B).

In this case, since, as shown in FIG. 8C, the intersection line of the flank surface and the plane U extends in the X axis direction, application of parallel light in a direction along the Z axis causes shade of the extended portion on a projection plane that is orthogonal to the application direction of the parallel light, hindering position detection of the flank surfaces. In order to reduce the effect of the shade, the light casting direction is inclined at an angle corresponding to the lead angle ($=\eta°$), so as to apply the parallel light in a direction along a Z2 axis in FIG. 8C. In this case, although errors are reduced as compared with the case in which the parallel light is applied in the direction along the Z axis, a portion of the intersection line of the flank surface and the plane U that is projected on an X2 axis is still detected as a shade.

For estimating errors to be generated in application of parallel light in the direction along the Z2 axis, FIG. 9 shows an exemplary intersection line in X2-Z2 coordinates of a flank surface and a plane U. FIG. 9 shows results calculated for a thread that has an outer radius of 90 mm, a thread crest height of 3 mm, and a thread pitch of 6 mm, as well as a geometry in which the flank surfaces are perpendicular to the thread axis. In this case, owing to the shade of the ridges of the thread crests, a measurement error of 2 μm is caused at the central positions in thread crest height direction of the flank surfaces.

Also, in the case of hooked flank surfaces, the error grows greater. Consider a thread that has an outer radius of 90 mm, a thread crest height of 3 mm, and a thread pitch of 6 mm as in the above case, and in which the flank surfaces are inclined at an angle of −3° (θ of FIG. 7 is −3°) on the assumption that the angle is indicated in positive value in the case where a flank surface locates at a central position in X axis direction of a thread crest as the flank surface goes up from the base toward the tip of the thread crest; in this case, an error of approximately 78 μm is generated due to the shade of the ridges of the thread crests. An error of approximately 39 μm is generated even in the case where the thread crest height is 1.5 mm. Such errors are intolerable in the quality assessment of threaded pipes.

As described above, even when thread features associated with flank surfaces are measured through application of parallel light to thread grooves, as with the thread feature measurement apparatus described in Patent Documents 1 and 2, the shade of thread crests inevitably gives rise to errors. Accordingly, the thread features associated with the flank surfaces, including the thread crest width, thread groove width, lead angle, thread pitch, and angle of the flank surfaces, result in inaccurate measurement values.

<2. Problems of Difference Between a Measurement Position on a Thread Feature Measurement Apparatus and an Actual Position at which the Measurement is Performed>

The present inventors proceeded to study problems concerning measurement errors due to positional deviation between a thread feature measurement apparatus and a threaded pipe.

For example, in a case where a thread feature measurement apparatus is applied to a pipe continuous processing line for measurement, a threaded pipe fed is automatically gripped with a gripping mechanism to measure thread features by the thread feature measurement apparatus. In this case, if the measurement standard axis of the thread feature measurement apparatus or the gripping center of the gripping mechanism widely deviates from the thread axis of the threaded pipe fed, accurate measurement of the thread features is impossible.

And beside, the pipe axis of a threaded pipe (the central axis of a central portion of a pipe) deviates, although slightly, from the thread axis (the central axis of a pipe end), which is often the case with actual threaded pipes.

As a result of checking differences in angle between thread axes and pipe axes of actual threaded steel pipes, an angle difference on the order of 0.057° (an inclination of $1/1000$), e.g., 0.11° (an inclination of $2/1000$) depending on the circumstances, was found.

FIG. 10 illustrates effects caused by the angle difference. FIG. 10 shows intersection lines of a flank surface and a plane U in the X2-Z2 axes coordinate system within the plane U, where differences ranging from 0.029° to 0.11° occur between the angle of light casting direction (Z2 axis) relative to the Z axis and the lead angle, due to the aforementioned angle difference between the thread axis and the pipe axis, in a thread having the same geometry as that of FIG. 9. The portions projected on the X2 axis of the intersection lines create shade, and hence the measurement error at the central position in thread crest height direction of the flank surface is 33 μm in the X axis direction in the case of difference by 0.11° between the angle of light casting direction (Z2 axis) relative to the Z axis and the lead angle. Similarly, the error is 17 μm in the case of difference by 0.059°, and the error is 9 μm in the case of difference by 0.029°. As is described, slight deviation between the thread axis and the pipe axis is a critical factor among error factors in position measurement of flank surfaces; however, such slight deviation between the thread axis and the pipe axis (on the order of $1/1000$) is not detected easily, and it is extremely difficult to regulate the deviation in gripping a threaded pipe for measurement or in installing the pipe in place.

Accordingly, in the measurement only using parallel light as described in Patent Document 1, it has to be permitted for the thread axis direction to have deviation on the aforementioned order relative to the pipe axis direction, which leads to such a significant error that is impermissible for the flank surface position measurement at, e.g., the central positions in thread crest height direction of the flank surfaces. Thus, the impermissibly significant measurement error affects the result of measurement of the thread features associated with the flank surfaces (requiring the coordinates of central portions in thread crest direction of the flank surfaces) including the angle of the flank surfaces, thread crest width, thread groove width, lead angle, and thread pitch, undermining possibility of highly accurate measurement.

In addition, in the case where a threaded pipe is gripped for measurement with a gripping mechanism such as a chuck, a rolled surface of the threaded pipe to be measured, which surface is not situated in the measurement location and is not processed by lathe, is gripped on. Hence, as shown in FIG. 11, even if a gripping mechanism with a highly accurate centripetal function is adopted for use, a deviation that is approximately equal to or larger than the aforementioned deviation between the thread axis and the pipe axis occurs between the pipe axis and the gripping center of the gripping mechanism when the threaded pipe is gripped with the gripping mechanism. The "gripping mechanism with a highly accurate centripetal function" refers to one with which, when gripping a straight and perfectly circle rod, the deviation between the axis of the rod and the gripping center of the gripping mechanism is sufficiently small, for example, the deviation is well below 0.1 mm. A deviation is generated between the pipe axis and the gripping center of the gripping mechanism as is described because of multiple occurrence of problems including bending or variation in circularity of the pipe, effects due to roughness of the pipe surface, and centripetal errors of the gripping mechanism (deviation between the gripping center and the pipe axis stemming from the gripping mechanism). The deviation between the gripping center of the gripping mechanism and the pipe axis, in conjunction with the deviation between the pipe axis and the thread axis, makes it further difficult to find the position of the thread axis.

According to the measuring method of Patent Document 2, there is disclosed detecting of a thread axis with a contact sensor; however, the method entails some problems. In the method of detecting a thread axis described in Patent Document 2, the displacement (displacement along the X axis direction) of a seal portion on a pipe end is measured at a plurality of locations in a circumferential direction of the pipe, based on which displacement the inclination of the pipe endface is found, and the inclination of the thread axis is measured on the assumption that the direction perpendicular to the pipe endface is the orientation of the thread axis. The problems with the method include necessity of contacting the sensor with a portion of the pipe end seal portion that is least desirable of flaws and stains. Contacting the sensor with the portion is prone to cause a flaw or stain. A flaw on the seal portion is unacceptable, for it seriously degrades the quality of the product. Adhesion of a stain necessitates cleaning of the seal portion, which consequently significantly interferes with the productivity.

In addition, according to the method of Patent Document 2, there is described that a pipe central point (a predetermined point on the pipe axis) is aligned with a central point of a measurement stage for finding a thread axis, on the premise that the pipe axis agrees with the thread axis. In order to find a thread axis highly accurately, it is required to specify the coordinates of at least a predetermined point (thread center) on the thread axis, in addition to the inclination of the thread axis. In Patent Document 2, the coordinates are found in such a manner that three rods are inserted to the inner surface of the pipe and made in contact with the pipe internally to cause the measurement stage to be moved by the reaction force produced against the internal contact of the rods and to bring the measurement stage central point in agreement with the pipe central point, i.e., the thread center. As described earlier, however, the thread axis of a thread formed by lathe turning does not always agree with the pipe axis of the threaded pipe at a portion that is not processed by lathe. Thus, the operation of bringing the measurement stage central point into agreement with the pipe central point may not be bringing the measurement stage central point in agreement with the thread center. Also, it is difficult to make the rods in proper and stable internal contact with the inner surface of the pipe.

As described above, since there occurs a nonnegligible difference between the thread axis of a thread to be actually measured and the measurement center through the above method also, the thread axis cannot be found at a satisfactory degree of accuracy. Moreover, the method involves an increased number of measurement items, and attitude and position control therefor has to be performed at times multiplied accordingly, thus hindering expedition of the measurement.

As described above, large deviation between the measurement standard axis of a thread feature measurement apparatus or the gripping center of a gripping mechanism and the thread axis of a threaded pipe fed invites inaccurate measurement result of thread features.

The present invention was completed based on the above-described discoveries newly made by the present inventors.

That is, a thread feature measurement apparatus according to the present invention is provided to solve the aforementioned problems and relates to an apparatus for measuring thread features of a threaded pipe or tube end. The apparatus comprises: an optical sensor that measures a first thread feature by detecting light that reaches from a light source located on the opposite side of the pipe or tube axis and runs substantially in parallel to the thread grooves; a contact sensor that measures a second thread feature by contacting a contact probe onto a thread flank surface and detecting the space coordinates of the contact probe at a time of contact; and a processor that calculates thread features from the combination of the first thread feature and the second thread feature.

A thread feature measuring method according to the present invention relates to a method of measuring thread features of a threaded pipe or tube end. The method comprises the steps of; measuring a first thread feature with an optical sensor by detecting light that reaches from a light source located on the opposite side of the pipe or tube axis and runs substantially in parallel to the thread grooves; measuring a second thread feature with a contact sensor by contacting a contact probe onto a thread flank surface and detecting the space coordinates of the contact probe at a time of contact; and calculating thread features from the combination of the first thread feature and the second thread feature.

Preferably, the thread flank surface includes a hooked frank surface having a hook shape.

With the apparatus and method for measuring thread features configured as above, the first thread feature is measured by detecting light that reaches from the light source located on the opposite side of the pipe or tube axis and runs substantially in parallel to the thread grooves. The second thread feature is measured by contacting the contact probe of the contact sensor on a thread flank surface and detecting the space coordinates of the contact probe at a time of the contact.

The first and second thread features thus detected are combined with each other by the processor to calculate thread features of the thread provided as a measurement object.

Thus, the first thread feature which is not associated with the thread flank surfaces is measured by detecting light that runs substantially in parallel to the thread grooves, whereas the second thread feature which is associated with the thread flank surfaces, the feature being liable to a measurement error when measured optically due to the aforementioned shade of the ridges of the thread crests, is measured by the contact sensor, and theses features are combined with each other. The thread features, including the thread feature associated with the thread flank surfaces, can thereby be measured highly accurately.

Particularly, highly accurate measurement can be effected even of the thread feature associated with the hooked flank surfaces that is liable to a significant measurement error when measured only optically, being hidden largely in the shade of the ridges of the thread crests.

Note that, although the "light that runs substantially in parallel to the thread grooves" refers to optically parallel light (light flux), the light is not limited to the light flux whose direction (optical axis direction) is completely parallel to the thread grooves. The light that runs substantially in parallel to the thread grooves encompasses light flux whose optical axis direction is completely parallel to the aforementioned Z axis as well as light flux whose optical axis direction exists between the Z axis and the thread groove.

Preferably, measurement by the optical sensor alone and measurement by both the optical sensor and the contact sensor are selectably performed.

In this case, it is possible to select between outputting, as it is, the first thread feature as a result of the measurement by the optical sensor as a measured thread feature and outputting a combination of the first thread feature as a result of the measurement by the optical sensor with the second thread feature as a result of the measurement by the contact sensor, as a measured thread feature.

Particularly, where the thread feature measurement apparatus according to the present invention is used as a measurement apparatus in a pipe or tube continuous processing line, a period permitted for measurement may be very short. If the quality of products is controlled within the continuous processing line using the present thread feature measurement apparatus, it may be said that not all thread features are necessarily measured automatically with all pipes or tubes. As the measurement by the optical sensor is completed in a relatively short period of time, the measurement by the optical sensor may be performed for all and the contact measurement may be performed every predetermined number, thereby conducting quality control using the automatic measurement of thread features according to the present invention. That is, the contact measurement is performed every predetermined number, and if there is no defectiveness found, that means the pipes or tubes between the measured ones may be determined to be acceptable with respect to the second thread feature associated with the flank surfaces. If a defective product is detected by the contact measurement, it is possible to determine defectiveness or to reexamine specifically, regressively for the predetermined number of products as from the one detected. Appropriate setting of the predetermined number enables suppression of damage caused at the time of determination of defectiveness, i.e., damages in terms of time and cost due to the need of total disposal of the predetermined number of products and of resuming measurement from the one behind by the predetermined number, to a relatively low degree while not interfering with the productivity. If a failure or defectiveness is detected with respect to the first thread feature that is not associated with the flank surfaces, during the measurement solely with the optical sensor on the predetermined number of products, the detection of the failure or defectiveness does not incur the need to perform measurement by the contact sensor; thus, it becomes possible to detect a failure in threading operation and the like more rapidly and to send a feedback about the failure at earlier timing. Of course, the method as above may be used for measurement of all the features by the optical sensor and contact sensor on the whole number of threaded pipes or tubes in a case where the production speed of the continuous processing line is sufficiently slow in comparison with the measurement speed, or in a case where multiple pieces of present apparatus can be installed and the processing can be distributed.

<3. Problems Concerning Thermal Expansion>

As described earlier, the threaded pipe or tube is, e.g., a steel pipe or tube provided with a thread, and the pipe or tube is thus subject to expansion/contraction depending on the temperature, which accompanies change in thread features due to the temperature. In this regard, a method is known conventionally in which a reference sample is measured, and based on the result, correction is made on errors due to thermal expansion in the thread features measured with the thread feature measurement apparatus.

According to the method, however, when a difference in temperature occurs between the reference sample and the threaded pipe or tube provided as a measurement object, an error is generated accordingly. For example, as the coefficient of thermal expansion of steel is about $1 \times 10^5 (1/° C.)$, a change in pipe or tube temperature of 10° C. causes a change in outer diameter of about 18 μm in a pipe or tube of 90 mm in radius. The temperature difference between the reference sample and the measurement object is brought about by difference in dimension and thermal capacity between the reference sample and the measurement object or difference in thermal hysteresis up to the measurement of thread features, i.e., temperature history of ambient temperatures or thermal hysteresis in, e.g., heating, cooling, rolling, and processing of the measurement object itself.

Accordingly, preferably, temperature of the threaded pipe or tube is obtained, and temperature correction is made on the measured values of the thread features based on the obtained temperature. For example, the following four methods (1) to (4) are conceivable as a method of obtaining the temperature of a threaded pipe or tube:

(1) A method of measuring the temperature of a threaded pipe or tube in the middle of or immediately before and after the measurement of thread features;

(2) A method of measuring the ambient temperature of a pipe or tube feeding mechanism that feeds a threaded pipe or tube to a measurement position for thread features, or measuring the ambient temperature at a standby position in the case where the threaded pipe or tube is made to stand by until commencement of the measurement at the measurement position to set the result of the measurement as the temperature of the threaded pipe or tube;

(3) A method of predicting the temperature of a threaded pipe or tube at the time of measurement of thread features, based on the dimensions and material of the threaded pipe or tube, processes until the thread feature measurement, and the process schedule; and (4) A method of performing a calculation to add a correction value that is set based on the dimensions and material of a threaded pipe or tube, processes until the thread feature measurement, and the process schedule, on an actually measured temperature of the threaded pipe or tube, or on an actual measurement value of the ambient temperature of a pipe or tube feeding mechanism that feeds a threaded pipe or tube, so as to set the result of the calculation as the temperature of the threaded pipe or tube.

In this case, the measured values of the thread features are corrected based on the temperature of the threaded pipe or tube used in actual measurement, whereby difference in temperature is prevented from being produced depending on which object and which moment the measurement is performed upon, hence providing even more accurate measurement results.

Preferably, there are provided a rotating device that rotates the threaded pipe or tube about the pipe or tube axis or a thread axis, and a rotation angle detecting device that detects the angle of rotation of the rotating device.

In this case, the threaded pipe or tube can be rotated by the rotating device about the pipe or tube axis or the thread axis, and the angle of rotation can be detected by the rotation angle detecting device. Accordingly, performing the thread feature measurement at a plurality of locations, e.g., at two to eight locations, in a circumferential direction of the threaded pipe or tube enables exact quality assurance in the form of results in the circumferential direction. Also, circumferential variation can be found in outer diameter measurement, so that even more accurate circularity can be obtained. The circularities of a threaded portion, parallel portion, seal portion, and pipe or tube shank can be obtained as variations in outer diameters or differences between maximal outer diameters and minimum outer diameters.

A thread feature measurement system according to the present invention comprises: the thread feature measurement apparatus configured as above; a gripping mechanism for fixing a threaded pipe or tube; and a height adjusting mechanism that adjusts the height of the threaded pipe or tube such that a central axis of the threaded pipe or tube is substantially aligned with a gripping center of the gripping mechanism or a measurement standard axis of the thread feature measurement apparatus.

For measuring a threaded pipe or tube processed on a continuous processing line or the like with the thread feature measurement apparatus configured as above, the optical measurement results and the contact measurement results need to be combined; therefore, the threaded pipe or tube provided as a measurement object is gripped with the gripping mechanism to be kept stationary until both the measurements are completed.

The height at which the threaded pipe or tube is placed can be adjusted by the height adjusting mechanism in such a manner that the measurement standard axis of the thread feature measurement apparatus is aligned with the central axis of the threaded pipe or tube.

Accordingly, even in a case where pipes or tubes of different diameters are fed in seriatim to the thread feature measurement apparatus on the continuous processing line or the like, fluctuation in measurement position can be restricted approximately to a degree of variation in radius of the pipes or tubes, hence expediting measurement of thread features.

For example, it is preferred that in a case where, e.g., a CCD camera having a photographing range of about 3 mm×3 mm to 10 mm×10 mm is used as the photoreceiving device of the optical sensor, the centripetal accuracy of the gripping mechanism for thread axes be equal to or less than 2 mm. The outer diameter set value of a pipe or tube provided as a measurement object is stored in advance, so that the position to be detected by the photoreceiving device can be decided in a well-planned manner and detected reliably. Attaining a centripetal accuracy level on thread axes on the order of several millimeters may be possible even in the case where there is deviation between a threaded axis and a pipe or tube axis as mentioned earlier.

And besides, in introducing a threaded pipe or tube into the gripping mechanism, the height of the threaded pipe or tube may be adjusted using the height adjusting mechanism in a way that supplements the centripetal function of the gripping mechanism, and the pipe or tube can be moved such that the central axis of the threaded pipe or tube is substantially aligned with the gripping center of the gripping mechanism. Thus, it is possible to avoid such a situation that the threaded pipe or tube fed is not centripetally held well owing to wide deviation between the pipe or tube axis of the pipe or tube and the gripping center of the gripping mechanism, or that the measurement of thread features is impeded by excessive inclination of the threaded pipe or tube at the measurement position.

Preferably, prior to measurement of the first and second thread features, detection is made of a distance between the measurement standard axis of the thread feature measurement apparatus and the thread axis of the threaded pipe or tube to be measured.

In the above-described thread feature measurement apparatus, errors that occur in the measurement by the optical sensor are made up for with the measurement of the positions of the thread flank surfaces by the contact sensor; however, if the first thread feature provided as the result of measurement by the optical sensor is combined with the second thread feature provided as the result of measurement by the contact sensor at a low level of combination accuracy, highly accurate measurement of the thread features is impossible. For this reason, the combination accuracy should be sufficiently high. With respect to the X and Y axes coordinates, the coordinates obtained in both the measurements can be matched with each other at a satisfactory degree of accuracy by means of, e.g., making comparison between predetermined reference values (reference positions) for the respective data obtained in both the measurements.

Meanwhile, errors generated in the direction of light-receiving axis of the optical sensor including the Z axis direction, i.e., the direction substantially parallel to the thread grooves, present a problem. The errors presumably include (1) an error in depth of field of the optical system and (2) an error due to discrepancy between the measurement standard axis of the contact sensor and the thread axis of the threaded pipe or tube to be measured.

Regarding the error (1), a deeper depth of field can accommodate more flexibly variation in thread axis in the light-receiving axis direction. Thus, for reliable measurement, a deeper depth of field is preferred. The depth of field relies on the performance of the optical system. For example, in a case where a CCD camera is used as the photoreceiving device and, e.g., a commercially available telecentric lens with a magnification of about 1.0× is adopted for the light collection optical system thereof to use parallel light flux obtained therefrom, the error (1) is about 0.5 mm (±0.25 mm).

Regarding the error (2), if the measurement standard axis of the contact sensor is not aligned with the thread axis of the threaded pipe or tube to be measured, the contact sensor will output measurement values of which the thread flank surface positions are displaced from the actually measured thread flank surface positions by an angle corresponding to the lead angle, in the X axis (thread axis) direction. The displaced amount of the thread flank surface positions constitutes a measurement error of the contact sensor.

FIG. 12 is an illustration for a case in which the distance between the measurement standard axis of the contact sensor and the thread axis of a thread pipe or tube to be measured is changed. Further, Table 1 below shows errors in thread flank surface position in the X axis direction in the case of FIG. 12. As shown in Table 1, an error corresponding to a lead angle is tolerated insofar as the distance between the measurement standard axis of the contact sensor and the thread axis (thread axis height) is around 0.5 mm. If the distance however is equal to or larger than 1 mm, the error in thread flank surface position in the X axis direction exceeds 10 μm, which results in a measurement result beyond an acceptable range.

grooves, whereas the second thread feature which is associated with the thread flank surfaces, the feature being liable to a measurement error when measured optically due to the aforementioned shade of the ridges of the thread crests, is measured by the contact sensor, and theses features are combined with each other. The thread features, including the thread feature associated with the thread flank surfaces, can thereby be measured highly accurately.

Particularly, highly accurate measurement can be effected even of the thread feature associated with the hooked flank surfaces that is liable to a significant measurement error when measured only optically, being hidden largely in the shade of the ridges of the thread crests.

With the thread feature measurement system according to the present invention, the height at which the threaded pipe or tube is placed can be adjusted by the height adjusting mechanism in such a manner that the measurement standard axis of the thread feature measurement apparatus is aligned with the central axis of the threaded pipe or tube. Accordingly, even in a case where pipes of different diameters are fed in seriatim to the thread feature measurement apparatus on the continuous processing line or the like, fluctuation in measurement position can be restricted approximately to a degree of variation in radius of the pipes or tubes, hence expediting measurement of thread features.

And besides, in introducing a threaded pipe or tube into the gripping mechanism, the height of the threaded pipe or tube may be adjusted using the height adjusting mechanism in a way that supplements the centripetal function of the gripping mechanism, and the pipe or tube can be moved such that the central axis of the threaded pipe or tube is substantially aligned with the gripping center of the gripping mechanism. Thus, it is possible to avoid such a situation that the threaded pipe or tube fed is not centripetally held well owing to wide

TABLE 1

| Outer Diameter (mm) | Root Diameter (mm) | Crest Height (mm) | Pitch (mm) | Lead Angle (deg) | Thread Axis Height (mm) | Error In Thread Flank Surface Position in X Axis Direction (mm) | Inclination Error (deg) |
|---|---|---|---|---|---|---|---|
| 180.0 | 174.0 | 3.0 | 6.0 | 0.61 | 1 | 0.0108 | −0.007 |
|  |  |  |  |  | 0.5 | 0.0054 | −0.003 |
| 120.0 | 116.4 | 1.8 | 5.0 | 0.76 | 1 | 0.0135 | −0.013 |
|  |  |  |  |  | 0.5 | 0.0067 | −0.007 |
| 60.0 | 58.8 | 0.6 | 3.0 | 0.91 | 1 | 0.0080 | −0.008 |
|  |  |  |  |  | 0.5 | 0.0040 | −0.004 |

As described above, since the error (1) is dominant, the distance between the measurement standard axis of the contact sensor and the thread axis is preferably set not larger than about ±0.25 mm.

Based on the above-described discoveries, prior to measurement by the thread feature measurement apparatus, detection is made of the distance between the measurement standard axis of the thread feature measurement apparatus and the thread axis of a threaded pipe or tube to be measured, whereby thread features can be measured with the position of the measurement standard axis of the contact sensor aligned highly accurately with the position of the thread axis of the threaded pipe or tube to be measured. Moreover, positional correction is performed on the data measured, so that even more accurate measurement results can be obtained.

With the thread feature measurement apparatus according to the present invention, the first thread feature which is not associated with the thread flank surfaces is measured by detecting light that runs substantially in parallel to the thread deviation between the pipe or tube axis of the pipe or tube and the gripping center of the gripping mechanism, or that the measurement of thread features is impeded by excessive inclination of the threaded pipe or tube at the measurement position.

BRIEF DESCRIPTION OF THE DRAWINGS

FIG. 12 illustrates a case in which the distance between the measurement standard axis of the contact sensor and the thread axis of a threaded pipe or tube to be measured is changed.

BEST MODE FOR CARRYING OUT THE INVENTION

A preferred embodiment of the present invention is described below with reference to the accompanying drawings.

First, a description is made on the structure of a hook thread including a hooked flank surface on an end of a threaded pipe provided as a measurement object of a thread feature measurement apparatus according to the present invention. The thread feature measurement apparatus according to the present invention is capable of measuring threaded pipes with common thread geometries besides the hook thread.

Figure 6:
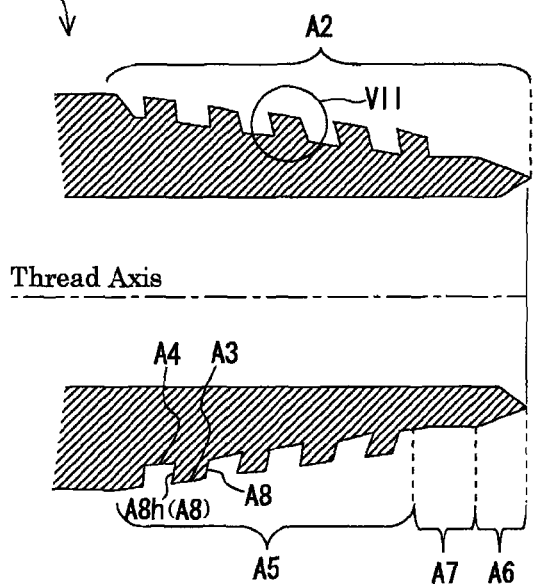
FIG. 6 is a schematic cross-sectional view parallel to an axis direction of a pipe or tube end on which a hook thread is provided.
Figure 7:
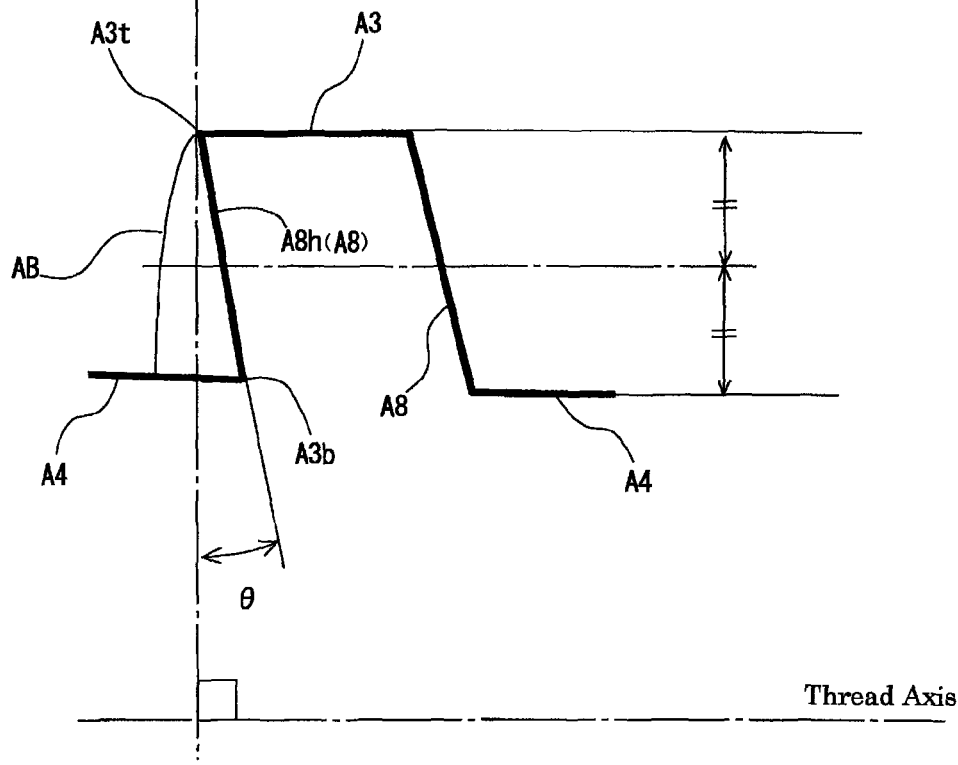
FIG. 7 is a partly enlarged view of a threaded portion of FIG. 6.
Figure 8A:
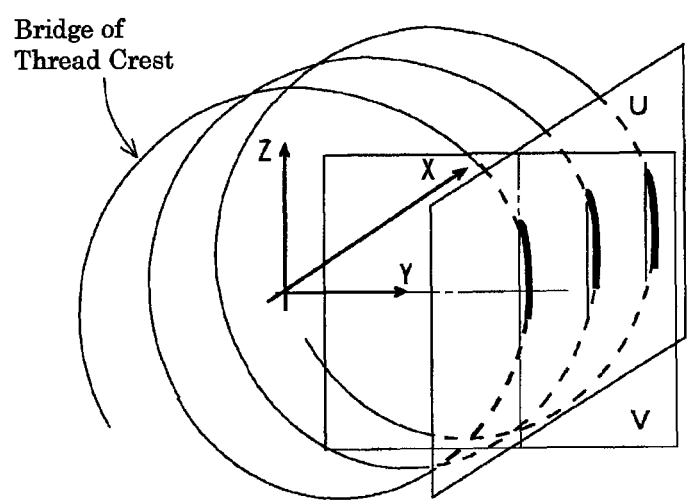
FIGS. 8A to 8C illustrate projecting a trajectory of flank surfaces at their central positions in thread crest direction in a common thread.
Figure 8B:
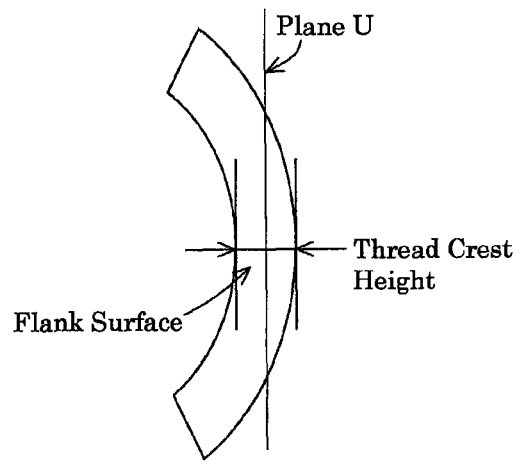
Figure 8C:
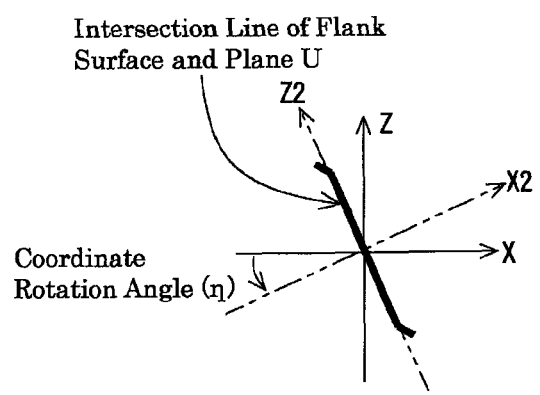
Figure 9:
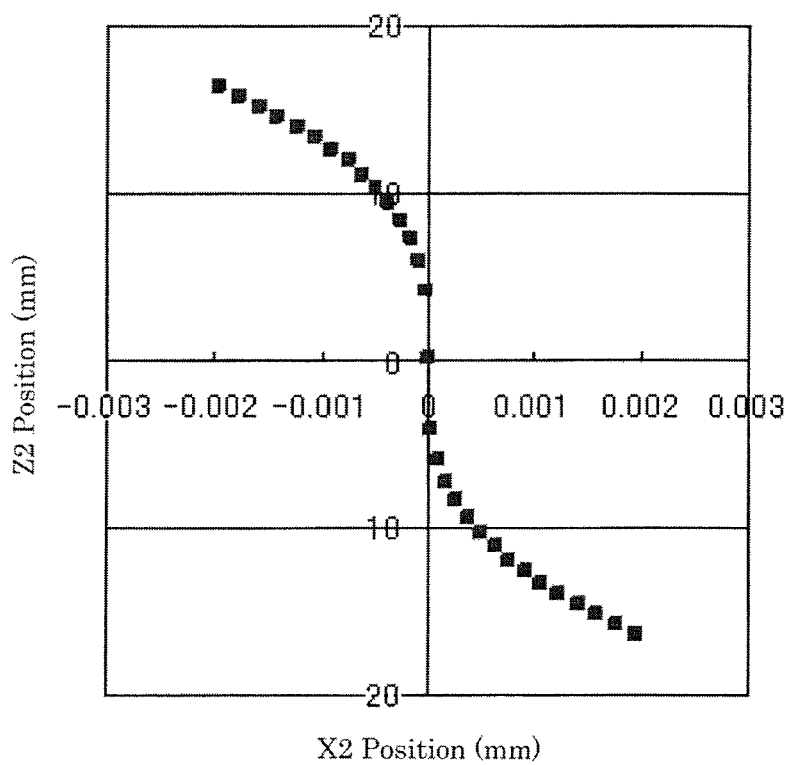
FIG. 9 shows an exemplary intersection line of a flank surface and a plane U in X2-Z2 coordinates at a time of application of parallel light in a direction along the Z2 axis.
Figure 10:
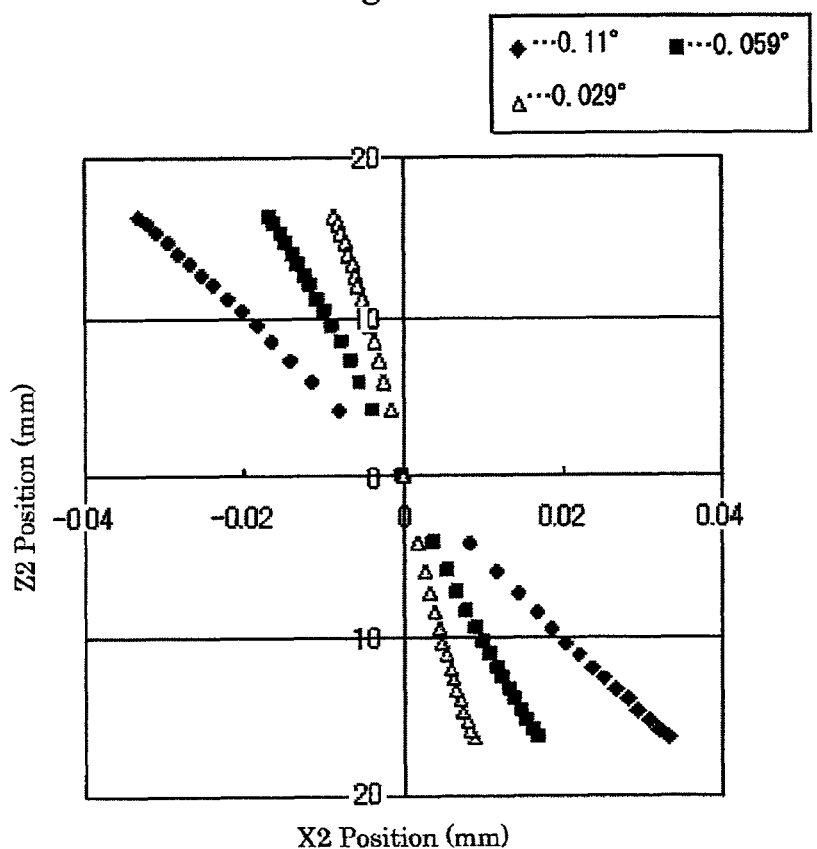
FIG. 10 illustrates an effect caused by an angle difference between a thread axis and a pipe or tube axis.
Figure 11:
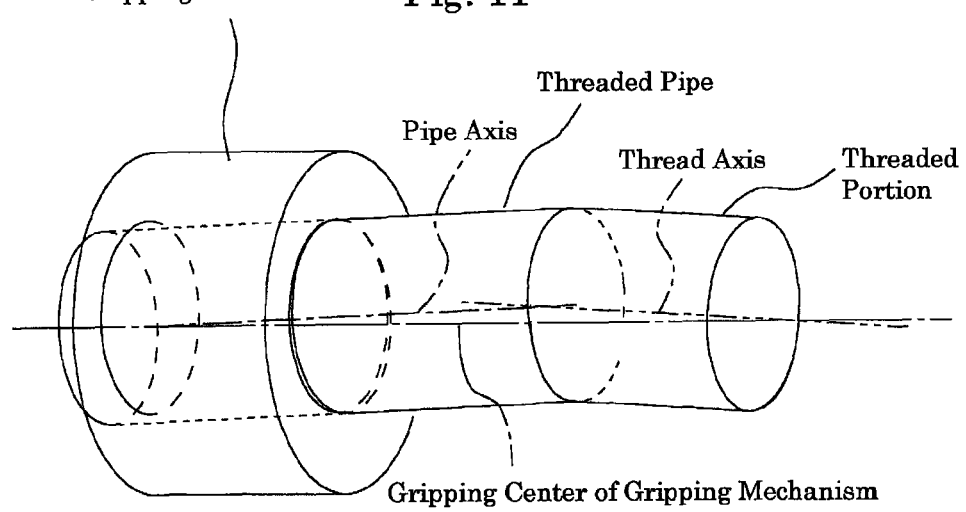
FIG. 11 illustrates deviation among the gripping center of a gripping mechanism, a pipe or tube axis, and a thread axis.

FIG. 6 is a schematic cross-sectional view parallel to the axis direction of a pipe end provided with a hook thread. FIG. 7 is an enlarged view of one thread crest in FIG. 6. In FIGS. 6 and 7, the pitch, size, and the like of the thread crests are changed deliberately from those of an actual thread for easy reference.

A thread A2 provided on an end of a threaded pipe A1 as shown in FIGS. 6 and 7 includes a threaded portion A5 in a geometry having thread crests A3 and thread grooves A4, a seal portion A6 provided at a front end of the pipe end, and a parallel portion A7 linking the threaded portion A5 with the seal portion A6.

Of flank surfaces A8 between the thread crests A3 and the thread grooves A4, the flank surfaces on a side of the thread crests A3 that faces toward the center of the threaded pipe in the thread axis direction are made into hooked flank surfaces A8h. As shown in FIG. 7, the hooked flank surfaces A8h incline toward the pipe endface side of the threaded pipe in the thread axis direction as the hooked flank surfaces advance from the tips A3t to the bases A3b of the thread crests A3.

Assuming that the angle is indicated in positive value in the case where the flank surfaces are located on a central side of the threaded pipe in the thread axis direction as the flank surfaces advance from the tips A3t toward the bases A3b of the thread crests A3, the inclination angle θ of the hooked flank surfaces A8h is −20°≤θ≤0°, and −5°≤θ<0° in many cases, typical of which is −3°.

For such a thread, thread features as follows are measured typically, although depending on the types and structures of the thread. In the present embodiment, for convenience of description, the thread features are divided into a first thread feature that is measurable only with an optical sensor 2 to be described later and a second thread feature that is difficult to be measured with the optical sensor 2 alone.

The first thread feature does not relate to fine and exact measurement of thread flank surfaces and includes all features that are measurable with the optical sensor 2. The first thread feature includes, e.g., the outer diameter of a threaded portion, and the outer diameter of a seal portion, the outer diameter of a parallel portion, a thread groove diameter, a thread crest height, a thread groove depth, thread taper (axial change in thread crest diameter and axial change in thread groove diameter), seal taper, change in taper, the circumferential deviation of various outer diameters (ellipticity), the axial length of the seal portion, and the axial length of the parallel portion. Additionally, the first thread feature also includes, e.g., the rims (ridges) of the thread crests, or alternatively, the approximate dimensions of the thread crests or thread grooves and profiles thereof that are needed for measuring the second thread feature, although these features do not belong to the quality control items.

The second thread feature relates to fine and exact measurement of thread flank surfaces and is unable to be measured at all or at a satisfactory degree of measurement accuracy with the optical sensor. That is, the second thread feature includes, e.g., the coordinates of the thread flank surfaces, particularly, the coordinates of the thread flank surfaces at a portion distant from (hidden by) the ridges of the thread crests, the angles of the thread flank surfaces, the spacing of the thread flank surfaces (a thread crest width, a thread groove width, a thread pitch, a lead angle), and the cross-sectional profile of the threaded portion including the thread flank surfaces. Additionally, the second thread feature includes, e.g., the curvature radius of the seal portion, the diameter of a pipe inner peripheral surface of the seal portion, and the taper of the inner peripheral surface.

A description is given next of a thread feature measurement apparatus according to the present invention for measuring the thread features formed on an end of the threaded pipe A1 provided with the hook thread A2 and of a thread feature measurement system to which the apparatus is applied.

Figure 1:
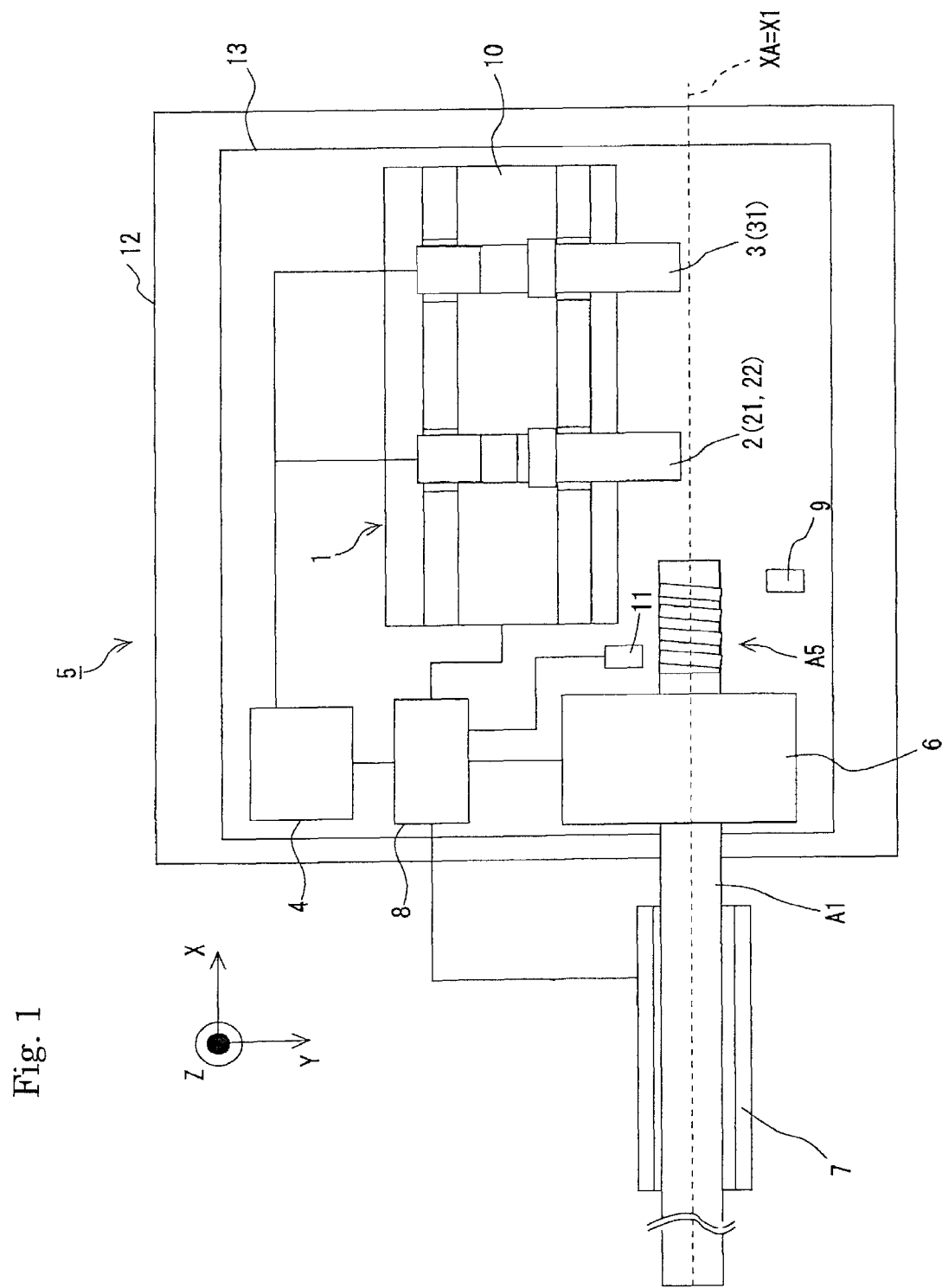
FIG. 1 is a schematic structural view of an embodiment of a thread feature measurement system to which a thread feature measurement apparatus according to the present invention is applied.
Figure 2:
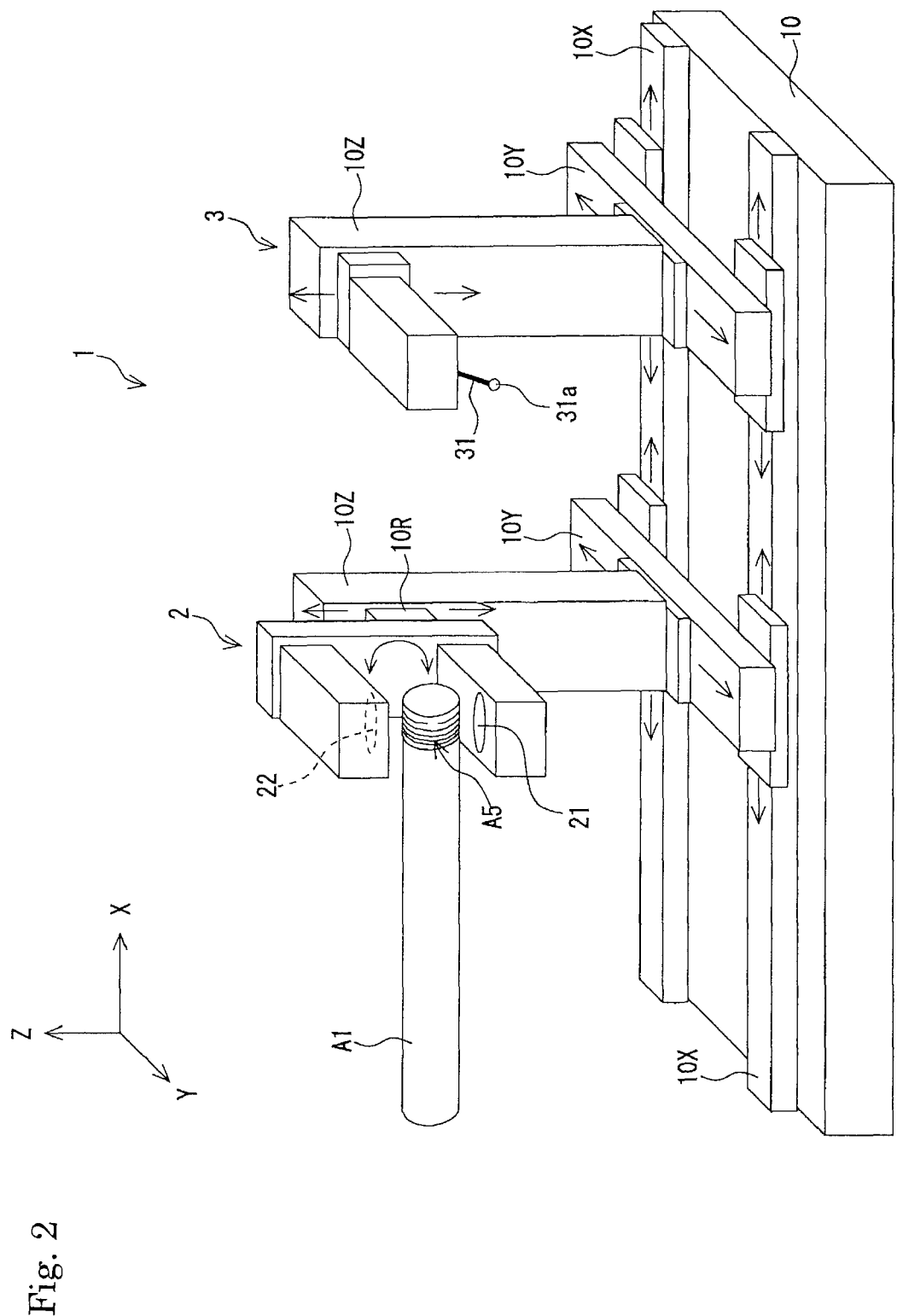
FIG. 2 is an enlarged perspective view showing movement stages of an optical sensor and of a contact sensor of the thread feature measurement apparatus of FIG. 1.

FIG. 1 is a schematic structural view of an embodiment of the thread feature measurement system to which the thread feature measurement apparatus according to the present invention is applied. FIG. 2 is an enlarged perspective view of movement stages of an optical sensor and of a contact sensor in the thread feature measurement apparatus of FIG. 1.

As shown in FIGS. 1 and 2, a thread feature measurement apparatus 1 of the present embodiment includes the optical sensor 2, a contact sensor 3, and a processor 4. The optical sensor 2 measures the first thread feature by means of detecting light that reaches from a light source 21 located on the opposite side of the pipe axis XA (which is described herein as being substantially equal to the thread axis) and runs substantially in parallel to the thread grooves A4. The contact sensor 3 measures the second thread feature by means of contacting a contact probe 31 on a thread flank surface A8 including a hooked flank surface A8h and detecting the space coordinates of the contact probe 31 at the time of the contact. The processor 4 calculates thread features from the combination of the first thread feature obtained from the optical sensor 2 and the second thread feature obtained from the contact sensor 3.

Moreover, as shown in FIGS. 1 and 2, a thread feature measurement system 5 to which the thread feature measurement apparatus 1 is applied includes the thread feature measurement apparatus 1, a gripping mechanism 6, and a height adjusting mechanism 7. The gripping mechanism 6 is adapted to fix a threaded pipe A1. The height adjusting mechanism 7 is adapted to adjust the height of the threaded pipe A1 so as to align, substantially, the central axis of the threaded pipe with the gripping center of the gripping mechanism 6 or the measurement standard axis of the thread feature measurement apparatus 1. In addition, the thread feature measurement system 5 includes a pipe control device 8 that performs control over the movement of the thread feature measurement apparatus 1 as well as the movement and rotation of the threaded pipe A1. The processor 4 provides instructions to the pipe control device 8 and aggregates conditions of the threaded pipe A1 and measurement values obtained at the thread feature measurement apparatus 1 for processing.

The thread feature measurement system 5 is configured such that at least the threaded portion A5 on the threaded pipe A1 is introduced, at the time of measurement, into an atmosphere-conditioned chamber 12 within which the room temperature and humidity are suitably conditioned.

The processor 4 and the pipe control device 8 are configured with a general-purpose or dedicated computer. The processor 4 is operative to acquire information on the threaded pipe A1 provided as a measurement object (including set values thereof) from a higher ranked computer (not shown), to transfer the thread features measured and calculated to the higher ranked computer, and to output the result of measurement to an output device (not shown) such as a monitor and a printer.

Additionally, the processor 4 outputs necessary thread features such as a thread diameter and a thread pitch based on the result of measurement in the form of numeral data. The device is also capable of comparing the numerical data obtained (the thread features) with the set values. The pipe control device 8 also performs, in conjunction with the higher ranked computer and the processor 4, such control as to feed a predetermined threaded pipe A1 on a processing line into the measurement condition as shown in FIG. 1 so as to perform measurement with the pipe gripped, and then to send the pipe out again to the downstream processing line.

Such a thread feature measurement apparatus 5 is applied to a continuous processing line (not shown) for threaded pipes A1. More specifically, a threaded pipe A1 to be measured is conveyed to the thread feature measurement apparatus (along the pipe axis XA direction) while being substantially aligned with the measurement standard axis of the thread feature measurement apparatus 1 by a pipe feeding mechanism (not shown) provided on the continuous processing line, whereon the pipe is measured.

At this time, the height adjusting mechanism 7 of the present embodiment also functions as a portion of the pipe feeding mechanism that feeds the threaded pipe A1 in the pipe axis direction. More specifically, the height adjusting mechanism 7 includes a V roll (not shown) of which the roll diameter is reduced at a central portion thereof. The V roll is rotated with the pipe axis XA of the threaded pipe A1 substantially aligned with the position of a groove on the V roll in X-Y planar view, so that the threaded pipe A1 is conveyed in the pipe axis direction. The measurement standard axis X1 of the thread feature measurement apparatus 1 and the gripping center X6 of the gripping mechanism 6 are set substantially aligned with the position of the groove on the V roll in X-Y planar view.

Figure 3:
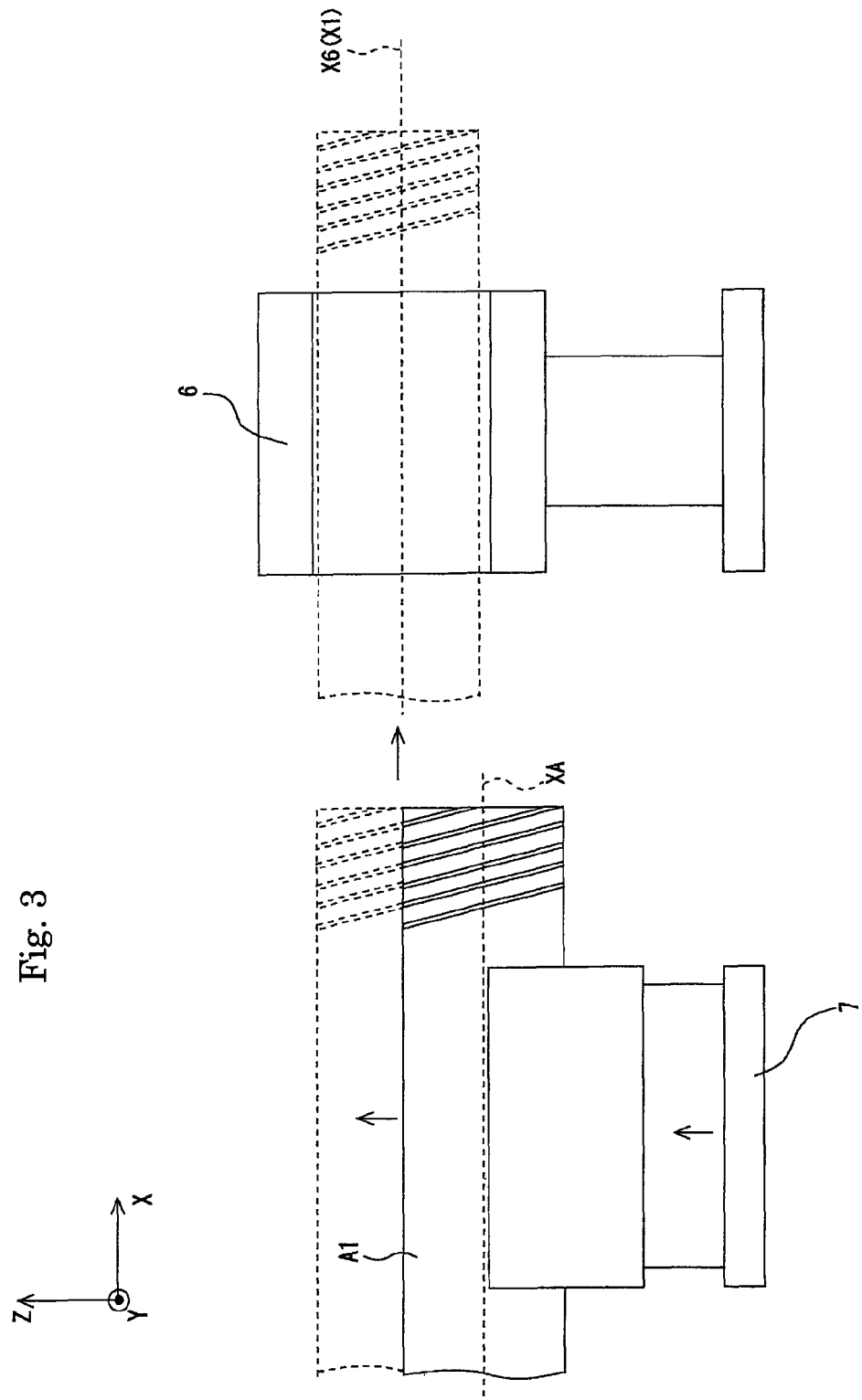
FIG. 3 is a side view of a height adjusting mechanism in the thread feature measurement system of FIG. 1.

FIG. 3 is a side view of the height adjusting mechanism in the thread feature measurement system of FIG. 1.

As shown in FIG. 3, provided as the height adjusting mechanism 7 with respect to the height direction of the threaded pipe A1 (the Z axis direction) is a raising and lowering mechanism capable of adjusting heightwise (in the Z axis direction) the position at which the threaded pipe A1 is supported by the V roll. With the height adjusting mechanism 7, the heights of threaded pipes A1 to be measured are adjusted for each height set value in accordance with the outer diameters of the pipes. The height set values are preliminarily stored in, e.g., the pipe control device 8, for control. The height adjustment by the height adjusting mechanism 7 may be performed at an accuracy level on the order of several millimeters, but a higher accuracy level is more preferred.

The threaded pipe A1 thus adjusted heightwise by the height adjusting mechanism 7 and conveyed by the V roll is inserted into the gripping mechanism 6 with the pipe axis XA (the thread axis) of the threaded pipe A1 substantially aligned with the gripping center X6 of the gripping mechanism 6 (and the measurement standard axis X1 of the thread feature measurement apparatus 1).

A pipe end detection device 9 is disposed at a predetermined distance from the gripping mechanism 6 on the downstream side in the threaded pipe A1 conveying direction. Upon detection of a threaded pipe A1 by the pipe end detection device 9, the pipe feeding by the pipe feeding mechanism (the V roll) is stopped. At this point, it is easily implemented that the threaded pipe A1 be stopped at a level of positional accuracy of about 2 mm at the pipe end.

Based on the stop signals sent to the pipe control device 8 upon stop of the threaded pipe A1 (the actual movement of the threaded pipe A1 may be detected, or a stop of the V roll may be considered to be a stop of the threaded pipe A1), the pipe control device 8 sends control signals to the gripping mechanism 6 to cause the gripping mechanism 6 to grip the threaded pipe A1. The gripping mechanism 6 for threaded pipes A1 may be one with a similar structure to that of, e.g., a chuck mechanism that is used for gripping a highly circular columnar rod to perform thereon processing by lathe or the like on the order of about 10 μm. The gripping mechanism 6 is provided with a rotating device (not shown) that causes the threaded pipe A1 to rotate about the pipe axis and a rotation angle detecting device (not shown) that detects the angle of the rotation.

The gripping position of the gripping mechanism 6 on the threaded pipe A1 and the pipe endface of the threaded pipe A1 are preferably spaced by a shortest possible distance that permits measurement of the thread features. Thus, effects caused by bending of the pipe can be suppressed to a maximal degree. Specifically, the distance is preferably in a range of about 200 mm to 400 mm. Generally, fluctuation on the order of several millimeters occurs horizontally (in the X and Y axes directions) and heightwise (in the Z axis direction) in the thread axes at pipe ends even of pipes of the same design dimensions. This is because the fluctuation is caused as a combined effect of two factors, i.e., fluctuation in bending of the pipes themselves and fluctuation in deviation between the thread axes and the pipe axes.

Subsequently, the structure of the thread feature measurement apparatus 1 of the present embodiment is described further specifically.

As shown in FIG. 2, the thread feature measurement apparatus 1 of the present embodiment is configured by the optical sensor 2 and the contact sensor 3 that are each installed on high precision X-, Y-, and Z-axial movement stages 10X, 10Y, and 10Z disposed on a measurement base 10. The optical sensor 2 and the contact sensor 3 are movable three-dimensionally by moving on the X-, Y-, and Z-axial movement stages 10X, 10Y, and 10Z. The three-dimensional amounts moved are processed at the processor 4 by recording displacement of the sensors relative to a predetermined reference position; particularly, the measurement standard axis X1 is set as the reference for the measurement in the Z direction.

In the present embodiment, for the optical sensor 2 and the contact sensor 3 to be movable independently, the X-, Y- and Z-axial movement stages 10X, 10Y, and 10Z are provided to each of the optical sensor 2 and the contact sensor 3; however, the X-, Y-, and Z-axial movement stages 10X, 10Y, and 10Z may be shared between the optical sensor 2 and the contact sensor 3, in other words, the optical sensor 2 and the contact sensor 3 may be disposed on one set of X-, Y-, and Z-axial movement stages.

In the present embodiment, the measurement base 10 and the gripping mechanism 6 are disposed on a vibro-isolating table 13 in the atmosphere-conditioned chamber 12 so as to prevent shakes of the threaded pipe A1 gripped with the gripping mechanism 6 as well as to prevent shakes of the optical sensor 2 and the contact sensor 3, thereby reducing measurement errors.

In measuring thread features using the thread feature measurement apparatus 1 according to the present embodiment, prior to measurement of the thread features, detected first is the distance (thread axis height) between the measurement standard axis X1 of the thread feature measurement apparatus 1 and the thread axis of the threaded pipe to be measured, and positional adjustment of the measurement standard axis X1 of the thread feature measurement apparatus 1 is made so that the thread axis height detected is brought to substantially zero, i.e., that the position of the measurement standard axis X1 of the thread feature measurement apparatus 1 is brought into substantial agreement with the position of the thread axis. As a device for detecting the thread axis height, the optical sensor 2 is used in the present embodiment. Note that a dedicated measurement device may be used independently of the optical sensor 2.

In detecting the thread axis height, the optical sensor 2 is first moved in the X and Y axes directions so that a photoreceiving device 22 is located immediately above a position roughly corresponding to the thread axis, in a predetermined measurement area (an area other than the threaded portion A5, such as the parallel portion A7 or the seal portion A6) on the threaded pipe A1. After that, the position of the measurement standard axis Z1 (the Z axis coordinates) is temporarily set, and the measurement area is photographed by the photoreceiving device 22 while the optical sensor 2 is being moved along the Z axis direction. In so doing, contrast in an image photographed by the photoreceiving device 22 is evaluated, and the position of the optical sensor 2 (the Z axis coordinates with reference to the temporarily set measurement standard axis X1) when the contrast becomes clearest is detected. Based on the position detected of the optical sensor 2 and the set values including the dimensions of the optical sensor 2 and outer radius of the measurement area, the thread axis height is calculated. In other words, the position (Z axis coordinates) of the thread axis is detected with the temporarily set measurement standard axis X1 set as a measurement reference.

Then, the position of the temporarily set measurement standard axis X1 is changed such that the thread axis height thus calculated is substantially zero, that is, the position of the changed measurement standard axis X1 is substantially the same as the detected thread axis position. In this manner, through adjustment of the height of the measurement standard axis X1 of the thread feature measurement apparatus 1 based on the position of the optical sensor 2 at a moment when the contrast of the photographed image becomes clearest, the position (Z axis coordinates) of the thread axis can be taken in the depth of field (focal range) of the photoreceiving device 22.

As described above, detecting the distance between the measurement standard axis X1 of the thread feature measurement apparatus and the thread axis of the threaded pipe to be measured prior to measurement by the thread feature measurement apparatus allows the thread features to be measured with the position of the thread feature measurement apparatus, especially the position of the measurement standard axis X1 of the contact sensor 3, aligned highly accurately with the position of the thread axis of the threaded pipe A1 to be measured, and also allows acquisition of highly accurate measurement results through positional correction on the measured data.

The height adjustment by means of this method enables the thread axis position to be aligned heightwise with the measurement standard axis X1 of the thread feature measurement apparatus 1 at an accuracy level of about 0.1 mm to 0.2 mm, which accuracy level is sufficiently of use.

Besides the above-described method, it is possible to use various methods including a laser triangulation method for detection of the thread axis height.

The optical sensor 2 includes the light source 21 such as a halogen lamp that radiates light toward the threaded portion A5 of the threaded pipe A1 and the photoreceiving device 22 that detects light that reaches from the light source 21 located on the opposite side of the pipe axis XA (approximately equal to the thread axis) of the threaded pipe A1 and runs substantially in parallel to the thread grooves The light source 21 and the photoreceiving device 22 are configured so as to be movable as a pair on the X-, Y-, and Z-axial movement stages 10X, 10Y, and 10Z.

Additionally, the movement stages of the optical sensor 2 includes a rotary stage 10R that is capable of causing the light source 21 and the photoreceiving device 22 to rotate integrally about the Y axis so that the orientations of the light source 21 and of the photoreceiving device 22 become substantially parallel to the thread grooves A4 of the threaded pipe A1. Specifically, the optical sensor 2 on the rotary stage 10R is rotated about the Y axis based on the lead angle (a set value), which angle is known in advance.

Note that the light running substantially in parallel to the thread grooves A4 is not limited to light flux whose optical axis direction is completely parallel to the thread grooves A4 and encompasses light flux whose optical axis direction is completely parallel to the Z axis as well as light flux whose optical axis direction exists between the Z axis and the thread grooves A4.

That the light is not limited to light whose optical axis direction is completely parallel to the thread grooves A4 is because, owing to bending at the end of the threaded pipe A1 to be measured, it may be difficult in actuality to increase parallelism relative to the actual thread grooves A4 even when the photoreceiving device 22 is inclined (by the lead angle) based on the value of the lead angle that is known in advance. If the direction of the photoreceiving device 22 deviates from the direction of the thread grooves A4, the ridges of the thread crests A3 or of the thread grooves A4 look stretched (see the extension of shade AB shown in FIG. 7) in the image obtained through measurement by the optical sensor 2, which brings on inability to determine the exact positions of the ridges (edges) of the thread crests A3 or the thread grooves A4. In the thread feature measurement apparatus 1 according to the present invention, so as to determine an edge position on at least one side (e.g., on the side of the pipe end) with respect to a central portion in thread axis direction of a thread crest A3 (or of a thread groove A4), the optical sensor 2 is rotated about the Y axis to incline the sensor in, e.g., a substantially intermediate direction between a direction corresponding to the preliminarily known lead angle (a set value) and the Z axis, whereon the measurement is performed.

Note that, if the photoreceiving device 22 is receivable of parallel light components, the light source 21 may radiate parallel light or light other than parallel light.

The photoreceiving device 22 may be a CCD camera with a photographing range of about 5 mm×5 mm to 10 mm×10 mm (a photoreceiving device with a pixel spacing of about several μm to 10 μm). Using, preferably, a CCD camera with a telecentric lens allows parallel light to be easily received at the photoreceiving device.

The result of photographing by the CCD camera is processed on a sub-pixel basis so as to provide a resolution and accuracy at a fraction of or several tens-th of the pixel size.

Note that the light source 21 may make use of laser, a telecentric lens, or the like to cast parallel light while the photoreceiving device 22 may use an optical system which does not have the telecentric lens as mentioned above, insofar as an equivalent effect can be obtained in term of geometrical optics.

Using such an optical sensor 2, detection is made of the light that reaches from the light source located on the opposite side of the pipe axis and runs substantially in parallel to the thread grooves A4, and the first thread feature that is not associated with the thread flank surfaces are thereby measured.

In the measurement of the first thread feature by the optical sensor 2, the aforementioned measurement standard axis X1 is set as a reference height. That is, the optical sensor 2 is focused on the measurement standard axis X1 to photograph the profile of areas around the thread. Specifically, with the light applied to the edges of the thread (located at substantially the same height as the thread axis with respect to the Z-directional position) from the light source 21, the outer shape of the threaded pipe A1 (where portions at which the light is shielded by the pipe or thread create shade) is photographed at the photoreceiving device 22.

Use of a CCD camera with the aforementioned telecentric lens as the photoreceiving device 22 allows light substantially parallel to the optical axis of the photoreceiving device 22 to be collected in the vicinity of the edges of the thread for imaging. Of the images obtained, areas (pixel positions) at which the light is shielded by the pipe or thread are detected as dark portions (at a detection luminance of E0), while areas at which the light is not shielded are detected as bright portions (at a detection luminance of E1). The areas detected at an intermediate brightness therebetween (at a detection luminance of E2) indicate the edges or borders of the thread. By segmenting the detection luminance into E0, E1, and E2, positions immediately inside the pixel positions (border positions) that are enclosed with the detection luminances of E0 and E1 are detected highly accurately as the coordinates of the edges of the thread.

As another method of detecting the coordinates of the edges of the thread, it is possible to use the aforementioned sub-pixel processing. Specifically, the results of luminance detection on pixel groups located in an area having the detection luminance E2 and areas therearound are plotted on a Cartesian coordinate system with the position of each pixel (the central position of each pixel corresponding to the real space) assigned to the horizontal axis coordinates and the detection luminance at each pixel to the vertical axis coordinates. The data plotted on this Cartesian coordinate system develops a relationship in which a monotonic increase or monotonic decrease is found in an area having the detection luminance E2. The relationship is approximated to a proper function (e.g., a linear function). Then, the horizontal axis coordinates corresponding to a threshold at a preliminarily set detection luminance (a threshold for detecting the coordinates of the edges of the thread) are calculated based on the function. The horizontal axis coordinates thus calculated are set as the coordinates of the edges of the thread. The sub-pixel processing as described above permits the coordinates of the edges of the thread to be detected at a higher resolution and higher accuracy level than based on the pixel size.

The thread outer shape, i.e., the profile at a measurement location (excluding the flanks surfaces) of the optical sensor 2 is acquired based on the sets of coordinates of the edges of the thread thus obtained.

As a range to be measured of the thread generally extends dimensionally beyond the photographing range of the photoreceiving device 22, the optical sensor 2 is moved to predetermined positions by each of the axial movement stages 10X, 10Y, and 10Z for repetitive measurement, and the measurement images taken at a plurality of locations are then linked together at the processor 4; in this manner, necessary measurement values of the first thread feature, such as a profile, can be calculated.

After the above-described measurement by the optical sensor 2, the movement of the contact sensor 3 is controlled so as to perform measurement of the second thread feature that is associated with the thread flank surfaces.

A measurement device which is generally referred to as a three-dimensional measuring machine may be applied to the contact sensor 3.

The contact sensor 3 is provided with the contact probe 31 that is movable three-dimensionally on each of the axial movement stages 10X, 10Y, and 10Z. The positions to which the contact probe 31 is moved are read by, e.g., a high precision linear encoder, and the positional data is transmitted to the processor 4. A substantially spherical contactor 31a is provided at a front end of the contact probe 31. Detection is made of slight force that is applied to the contactor 31a at an instant when the contactor 31a contacts a measurement object, whereupon calculation is performed for the coordinates of the central position of the spherical surface of the contactor 31a. In the present embodiment, while suitable measurement is performed with the contactor 31a having a diameter of not larger than 0.5 mm, the diameter is more preferably in a range of 0.1 mm to 0.3 mm.

As three-dimensional coordinate deviation is uniform from the position at which the contact probe 31 is installed up to the contactor 31a, calibration is made in advance based on, e.g., measurement results of a reference sample so that the central position coordinates of the contactor 31a can be calculated based on the positions to which the contact probe 31 is moved.

Figure 4:
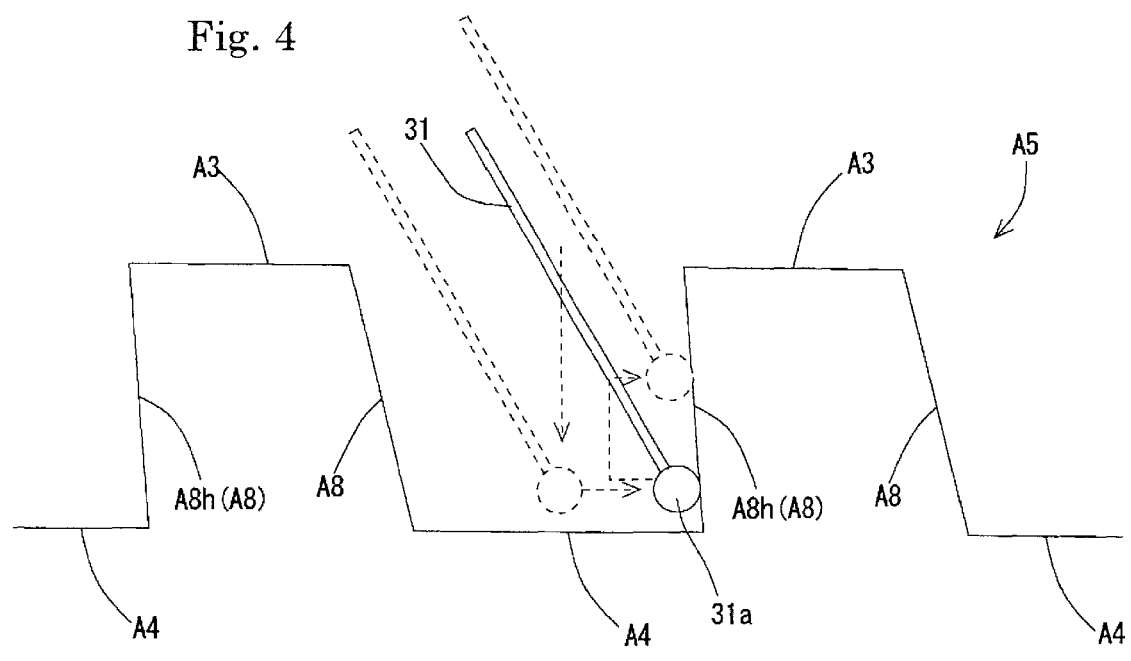
FIG. 4 is an illustration of a method of measuring flank surfaces using the contact sensor according the embodiment.

FIG. 4 is an illustration of a method of measuring the flank surfaces by the contact sensor according to the present embodiment.

A movement plan is prepared in advance for the contact probe 31 (the contactor 31a) such that the probe is movable relative to the thread A2 to be measured based on the design data of the thread A2. Meanwhile, the processor 4 is supplied with thread crest positions, thread axis height, and approximate positions of the flank surfaces in the form of coordinates, as the results of measurement by the optical sensor 2. The movement plan is revised based on the various coordinates thus obtained as the result of measurement by the optical sensor 2 to decide a movement route of the contactor 31a. In addition, the inclination of the contactor 31a is adjusted to an angle larger than the inclination of the flank surfaces A8 (A8h) to be measured. That is, adjustment is made such that the portion other than the contactor 31a (a strut portion) of the contact probe 31 shall not contact the flanks surfaces A8 (A8h) or the ridges of the thread crests.

Specifically, as shown in FIG. 4, the contact probe 31 is first moved in the Z axis direction to be adjusted such that the contactor 31a is located at an equal position to the measurement standard axis X1 (i.e., the above-described thread axis position). Subsequently, the contactor 31a is moved, at the position of a thread groove A4 in the X axis direction, along the Y axis direction to a position at a predetermined distance from the thread groove A4. Thereafter, the contact probe 31 is moved to carry the contactor 31a in the X axis direction as well as toward a flank surface A8 (A8h) to be measured, and the coordinates (the X-Y coordinates) of the contactor 31a are read at an instant when the contactor 31a contacts the flank surface A8 (A8h).

Subsequently, the contact probe 31 is moved such that the contactor 31a is separated by a predetermined distance in the X axis direction from the flank surface A8 (A8h) while being moved for a predetermined distance in the Y axis direction (in a direction away from the thread axis in FIG. 4), and then the contact probe 31 is moved such that the contactor 31a is again moved in the X axis direction as well as toward the flank surface A8 (A8h) to be measured, whereon the coordinates (the X-Y coordinates) of the contactor 31a are read at an instant when the contactor contacts the flank surface A8 (A8h) again. Such coordinate detection is repeated for a required number of times that is set in advance according to the specifications of the thread, thereby deciding the positions of the flank surfaces in the form of sets of obtained coordinates. The flank surface positions thus decided are positioned as the ridges of the thread crests A3 and of the thread groove A4 that have been measured with the optical sensor 2, whereby an overall positional relationship in the threaded portion A5 is specified. The second thread feature associated with the flank surfaces is obtained based on the positional data relating to the flank surfaces thus specified.

As described above, the first thread feature measured with the optical sensor 2 and the second thread feature measured with the contact sensor 3 are combined with each other at the processor 4.

Figure 5A:
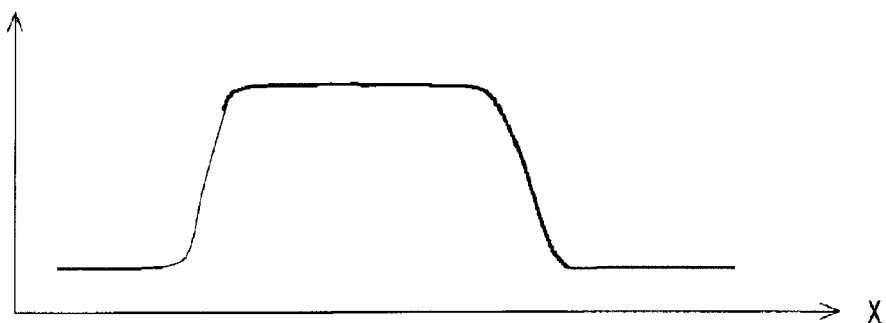
FIGS. 5A to 5C are illustrations of combining a first thread feature with a second thread feature.
Figure 5B:
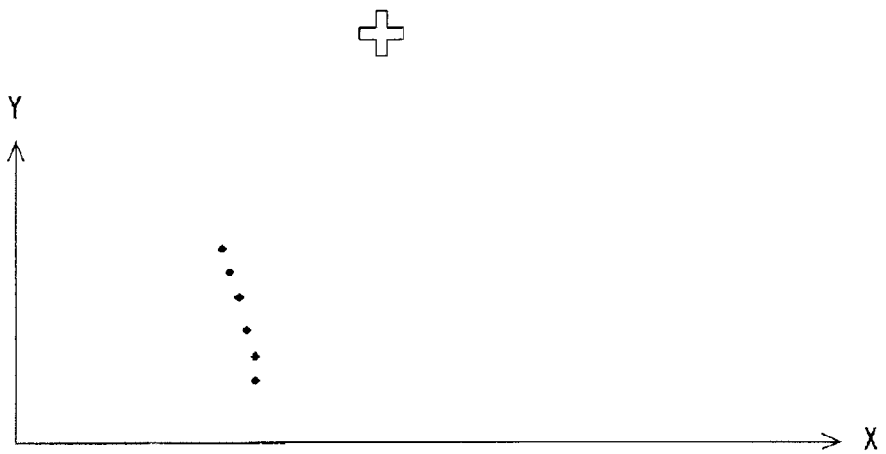
Figure 5C:
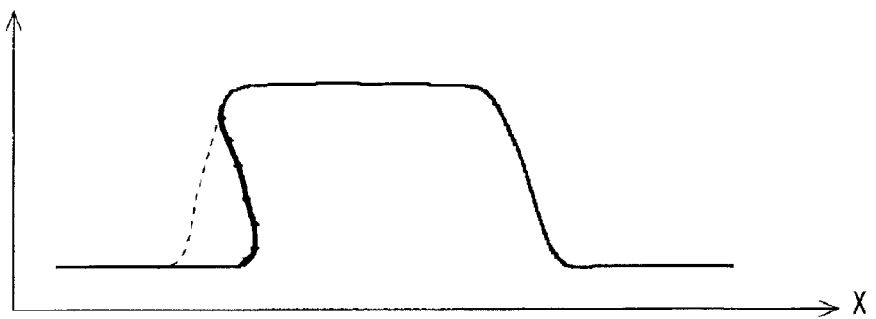

FIGS. 5A to 5C are illustrations of combining the first thread feature with the second thread feature. FIG. 5A shows a profile based on the result of measurement of the first thread feature, FIG. 5B shows a profile based on the result of measurement of the second thread feature, and FIG. 5C shows a profile after combination. For convenience's sake, FIGS. 5A to 5C show only a hooked flank surface A8h as a result of measurement of the second thread feature.

Specifically, as shown in FIGS. 5A to 5C, the first and second thread features are combined with each other in the form of coordinates in the X-Y plane on the above-described measurement standard axis X1 (the thread axis position). Particularly, the second thread feature is preferentially used for the flank surface A8 (A8h). In FIG. 5C, only the portion shown with the solid line is used, and the profile near the hooked flank surface A8h shown with the broken line (see FIG. 5A), which profile is obtained as a result of measurement of the first thread feature, is not used.

In the case where the above-described measurement of thread features is performed at a plurality of locations in a circumferential direction of a threaded pipe A1, the measurement is performed at a predetermined location, then the threaded pipe A1 is rotated by a predetermined angle around the gripping center of the gripping mechanism 6 using the rotating device of the gripping mechanism 6, the angle of rotation of the thread is detected using the rotation angle detecting device, and the measurement is performed again. The angle of rotation of the threaded pipe A1 or the angle of rotation of the gripping mechanism 6 may be approximated to the angle of rotation of the thread at this point.

The rotating device need not necessarily be built in the gripping mechanism 6, and a rotating device may be provided separately.

If the gripping center (the pipe axis) of the gripping mechanism 6 deviates from the thread axis, calculation is performed in advance as to which position the position of the thread axis detected before rotation will move to after the threaded pipe A1 is rotated by a predetermined angle, e.g., 90°, with the gripping mechanism 6. Then, preferably, the threaded pipe A1 is rotated actually at the predetermined angle with the gripping mechanism 6, followed by movement control of the optical sensor 2 and the contact sensor 3 based on the position of the thread axis after the calculated movement, so as to perform measurement.

In the present embodiment, temperature correction is made on the resultant values of the thread feature measurement. That is, the thread feature measurement system 5 according to the present embodiment includes a temperature sensor 11 that measures the temperature of the threaded pipe A1 provided as a measurement object, based on which temperature, temperature correction is made on the values of the thread features measured.

In this case, the measured values of the thread features are corrected based on the temperature of the threaded pipe A1 used in actual measurement, whereby difference in temperature is prevented from being produced depending on which object and which moment the measurement is performed upon, hence providing even more accurate measurement results.

Further, thermal expansion may occur in the thread feature measurement apparatus 1 itself. That is, an error may be generated in travel distances (sensor positions) in causing the optical sensor 2 and the contact sensor 3 to be moved by each of the axial movement stages 10X, 10Y, and 10Z, due to thermal expansion. In this regard, use of an encoder with a substrate of quartz glass or low thermal expansion glass in the method of detecting sensor positions can bring such error to a permissible degree.

The temperatures of threaded pipes A1 are substantially equal to the properly adjusted temperature in the factory; therefore, measurement may be conducted of the ambient temperature at or around a position where threaded pipes A1 to be measured pass through, and based on the temperature measured, correction may be performed on the measured values of the thread features. In order to perform correction with increased accuracy, it is preferred that the temperature of the threaded pipe A1 or the thread A2 be measured in the middle of measurement of the thread features or immediately before and after the measurement, whereon correction is made on the result of the thread feature measurement.

Note that the temperature sensor 11 may be disposed at a position other than the exemplary position shown in FIG. 1. That is, the sensor does not have to be disposed in the vicinity of the threaded portion A5. For example, the sensor may be disposed at, e.g., a central portion of the threaded pipe A1. In addition, even when the temperature of the threaded pipe A1 is measured on the upstream side of the line of the present measurement system, the temperature measurement value may be used in temperature correction insofar as there is caused no significant temporal delay until the thread feature measurement and the temperature fluctuation is small.

As described above, with the thread feature measurement apparatus 1 according to the present embodiment, the first thread feature is measured by means of detection of light that reaches from the light source located on the opposite side of the pipe axis and runs substantially in parallel to the thread grooves A4. The second thread feature is measured by means of detection of the space coordinates of the contact probe 31 (the contactor 31a) of the contact sensor 3, the probe (contactor) being contacted with a thread flank surface A8 (A8h).

The first and second thread features detected are combined by the processor 4, so that thread features of the thread provided as a measurement object are calculated.

Thus, the first thread feature which is not associated with the thread flank surfaces A8 (A8h) is measured by means of detection of light that runs substantially in parallel to the thread grooves A4, whereas the second thread feature which is associated with the thread flank surfaces A8 (A8h), the feature being liable to a measurement error when measured optically due to the above-described shade of the ridges of the thread crests A3, is measured by the contact sensor 3. These features are combined with each other, thereby enabling highly accurate measurement on thread features including the thread feature associated with the thread flank surfaces A8 (A8h).

Particularly, highly accurate measurement can be effected even of the thread feature associated with the hooked flank surfaces A8h that is liable to a significant measurement error when measured only optically, being hidden largely in the shade of the ridges of the thread crests A3.

Moreover, with the thread feature measurement system 5 according to the present embodiment, the height at which the threaded pipe A1 is placed can be adjusted in such a manner that the measurement standard axis X1 of the thread feature measurement apparatus 1 is aligned with the central axis of the threaded pipe A1 by the height adjusting mechanism 7. Accordingly, even in a case where pipes of different diameters are fed in seriatim to the thread feature measurement apparatus 1 on, e.g., a continuous processing line, fluctuation in measurement position can be restricted approximately to a degree of variation in radius of the pipes, hence expediting measurement of thread features.

And besides, in introducing a threaded pipe A1 into the gripping mechanism 6, the height of the threaded pipe A1 may be adjusted using the height adjusting mechanism 7 in a way that supplements the centripetal function of the gripping mechanism 6, and the pipe can be moved such that the central axis of the threaded pipe A1 is substantially aligned with the gripping center of the gripping mechanism 6. Thus, it is possible to avoid such a situation that the threaded pipe A1 fed is not centripetally held well owing to wide deviation between the pipe axis of the pipe and the gripping center of the gripping mechanism 6, or that the measurement of thread features is impeded by excessive inclination of the threaded pipe A1 at the measurement position.

The thread feature measurement system 5 according to the present embodiment is configured to selectably perform the measurement by the optical sensor 2 alone and the measurement by both the optical sensor 2 and the contact sensor 3.

In this case, switching is performed at appropriate timing between outputting, as it is, the first thread feature as a result of the measurement by the optical sensor 2 as a measured thread feature and outputting a combination of the first thread feature as a result of the measurement by the optical sensor 2 with the second thread feature as a result of the measurement by the contact sensor 3, as a measured thread feature, whereby the thread feature measurement can be expedited without disturbing quality control.

While an embodiment according to the present invention is described hereinbefore, the present invention is not limited to the embodiment, and various improvements, changes, and modifications are possible without departing from the scope of the invention.

The invention claimed is:

1. An apparatus for measuring thread features of a threaded pipe or tube end, comprising:
    an optical sensor that measures a first thread feature, which does not relate to measurement of a thread flank surface, by detecting light that reaches from a light source located on the opposite side of the pipe or tube axis and runs substantially in parallel to the thread grooves;
    a contact sensor that measures a second thread feature, which relates to measurement of the thread flank surface, by contacting a contact probe onto the thread flank surface and detecting the space coordinates of the contact probe at a time of contact; and
    a processor that calculates thread features from the combination of the first thread feature and the second thread feature,
    wherein the contact sensor measures a profile of the thread flank surface by contacting the contact probe onto measuring points of the thread flank surface, the measuring points being spaced each other at different distances to the pipe or tube axis,
    wherein the processor combines a profile of an area other than the thread flank surface measured by the optical sensor with the profile of the thread flank surface measured by the contact sensor to calculate a thread profile, and
    wherein the thread flank surface includes a hooked frank surface having a hook shape.

2. The thread feature measurement apparatus according to claim 1, the apparatus being configured to selectably perform measurement by the optical sensor alone and measurement by both the optical sensor and the contact sensor.

3. The thread feature measurement apparatus according to claim 1, wherein temperature of the threaded pipe or tube is obtained, and temperature correction is made on the measured values of the thread features based on the obtained temperature.

4. The thread feature measurement apparatus according to claim 1, further comprising:
    a rotating device that rotates the threaded pipe or tube about the pipe or tube axis or a thread axis; and
    a rotation angle detecting device that detects the angle of rotation of the rotating device.

5. A thread feature measurement system comprising:
    the thread feature measurement apparatus of claim 1;
    a gripping mechanism for fixing a threaded pipe or tube; and
    a height adjusting mechanism that adjusts the height of the threaded pipe or tube such that a central axis of the threaded pipe or tube is substantially aligned with a gripping center of the gripping mechanism or a measurement standard axis of the thread feature measurement apparatus.

6. The thread feature measurement system according to claim 5, wherein
    prior to measurement of the first and second thread features, detection is made of a distance between the measurement standard axis of the thread feature measurement apparatus and the thread axis of the threaded pipe or tube to be measured.

7. A method of measuring thread features of a threaded pipe or tube end, comprising the steps of:
    measuring a first thread feature, which does not relate to measurement of a thread flank surface, with an optical sensor by detecting light that reaches from a light source located on the opposite side of the pipe or tube axis and runs substantially in parallel to the thread grooves;

measuring a second thread feature, which relates to measurement of the thread flank surface, with a contact sensor by contacting a contact probe onto a thread flank surface and detecting the space coordinates of the contact probe at a time of contact; and calculating thread features from the combination of the first thread feature and the second thread feature, wherein in the step of measuring the second thread feature, a profile of the thread flank surface is measured with the contact sensor by contacting the contact probe onto measuring points of the thread flank surface, the measuring points being spaced each other at different distances to the pipe or tube axis, wherein in the step of calculating thread features, a profile of an area other than the thread flank surface measured by the optical sensor and the profile of the thread flank surface measured by the contact sensor are combined with each other to calculate a thread profile, and wherein the thread flank surface includes a hooked frank surface having a hook shape.

* * * * *